US010963870B2

(12) United States Patent
Levin

(10) Patent No.: US 10,963,870 B2
(45) Date of Patent: Mar. 30, 2021

(54) METHOD AND SYSTEM FOR NETWORK COMMUNICATION

(71) Applicant: Pavel Levin, Brooklyn, NY (US)

(72) Inventor: Pavel Levin, Brooklyn, NY (US)

(73) Assignee: Vaposun Inc., Brooklyn, NY (US)

( * ) Notice: Subject to any disclaimer, the term of this patent is extended or adjusted under 35 U.S.C. 154(b) by 331 days.

(21) Appl. No.: 15/347,781

(22) Filed: Nov. 10, 2016

(65) Prior Publication Data

US 2017/0148018 A1 May 25, 2017

Related U.S. Application Data

(60) Provisional application No. 62/253,663, filed on Nov. 10, 2015.

(51) Int. Cl.
*G06Q 20/38* (2012.01)
*G06Q 20/20* (2012.01)
*G06Q 20/32* (2012.01)
*G06Q 20/40* (2012.01)
*H04W 12/04* (2021.01)
*H04W 12/06* (2021.01)
*H04L 29/06* (2006.01)
*H04W 12/08* (2021.01)
*H04W 12/00* (2021.01)

(52) U.S. Cl.
CPC ....... *G06Q 20/3829* (2013.01); *G06Q 20/202* (2013.01); *G06Q 20/325* (2013.01); *G06Q 20/401* (2013.01); *H04W 12/04* (2013.01); *H04W 12/06* (2013.01); *G06Q 2220/00* (2013.01); *H04L 63/0823* (2013.01); *H04W 12/00502* (2019.01); *H04W 12/08* (2013.01)

(58) Field of Classification Search
CPC ............... G06Q 20/202; G06Q 20/325; G06Q 20/3829; G06Q 20/401; H04W 12/04; H04W 12/06; H04W 12/00502; H04L 63/0823; B60L 53/57; G07F 15/005
USPC ...................................................... 705/64, 71
See application file for complete search history.

(56) References Cited

U.S. PATENT DOCUMENTS

| 8,401,906 B2 | 3/2013 | Ruckart |
| 2008/0240440 A1 | 10/2008 | Rose |
| 2011/0321145 A1 | 12/2011 | Shimotono |
| 2014/0026193 A1 | 1/2014 | Saxman |
| 2015/0052352 A1 | 2/2015 | Dolev |
| 2015/0237040 A1 | 8/2015 | Levin |
| 2016/0127901 A1* | 5/2016 | Lee ........................ H04W 12/06 713/181 |

\* cited by examiner

*Primary Examiner* — Igor N Borissov

(57) ABSTRACT

Technologies are generally described for methods and systems effective to secure process synchronized requests after at least one secure inter-device communication link between the originating and confirming communication devices is established. A method may include forwarding, by the confirming communication device the request and receiving, by a server, a first request from the originating device and at least one second request from the confirming device. The method may also include, by the server, determining a sequence of receiving of the first and the at least one second requests and processing the requests in order to authenticate a communication device, accept or reject a financial transaction, based on the receiving sequence and receiving time difference.

20 Claims, 7 Drawing Sheets

METHOD AND SYSTEM FOR NETWORK COMMUNICATION

CROSS-REFERENCE TO RELATED APPLICATIONS

This patent application claims the benefit of priority, under 35 U.S.C. Section 119(e), U.S. Provisional Patent Application No. 62/253,663 "Secure data capturing in mobile networks" to Pavel Levin, filed on Nov. 10, 2015.

STATEMENT REGARDING FEDERALLY SPONSORED RESEARCH AND DEVELOPMENT

Not applicable.

REFERENCE TO SEQUENCE LISTING, A TABLE, OR A COMPUTER PROGRAM LISTING, COMPACT DISC APPENDIX

Not applicable.

TECHNICAL FIELD OF THE INVENTION

The present invention relates to secure data communication in networks, such as mobile networks, particularly to systems and methods for secure identification of message originators and for processing requests, such as authentication requests or financial transaction authorization requests.

BACKGROUND

Two or more devices may form a network, such as mobile network, local area network (LAN), virtual private network (VPN), by establishing communication links with each other. The network communication link may be one embodiment of a communication media, which, by way of example and not limitation, may include wired media, such as a wired network or direct-wired connection, and wireless media such as radio frequency (RF), microwave, infrared (IR), acoustic, and other wireless media. The mobile devices may associate themselves with and transmit communications to devices outside of the mobile network establishing different types of communication links with them. A communication may include data, messages, signals transmitted from at least one device to at least another device according to one or more designated standards, formats, or protocols. In a Transmission Control Protocol/Internet protocol (TCP/IP) network, further referred as IP network, each device has its network identification, such as an IPv6 address; it may be also have a unique device identification (UDI), for example for medical devices. An identifier, which may be a code of any length or arbitrary ID of any kind, may be created by device for transmission and device authentication. Based on additional network identification information, such as a network name and password, a device may be authenticated, enabled to establish communication session, and may be issued network credentials, such as a X.509 digital certificate by a specifically dedicated computing devices, i.e. by authentication servers. During the communication session, for security purposes, the identifier, along with other data, may be encoded, encrypted using issued by the authentication server private-public key pair, or otherwise obfuscated when included in the message transmitted within the network.

Within a network, such as a mobile payment network, a social network, a conference network, a vehicular area network (VAN), an Internet-of-Things (IoT) network, or enterprise VPN, etc., some devices may be configured as servers for data collection and processing request from other devices and analysis. Said requests may include authentication requests, such as requests to join the network, as well as authorization requests, such as requests to perform financial transactions, to change device status, to transmit data, etc. The network servers may be configured to accept and/or reject requests of other devices (clients) based on the corresponding device network credentials and/or the location and/or additional information. Mobile devices configured for performing specific evaluation tasks may operate as mobile servers processing other mobile device requests to join the mobile network. If multiple devices, such as IoT devices, are infected by malware, they can send multiple requests staging denial-of-service (DoS) or, in complex networks, distributed denial of service (DDoS) attack on the network servers.

In a wireless communication network, network devices are communicated through networking devices, which may include routers, access points, switches, etc., or, in so-called ad-hoc networks, peer-to-peer (P2P). Ad-hoc networks may be communicatively coupled to other public or private networks. Ad-hoc networks may also include networking devices called beacon points that emit strong signal to facilitate P2P communication and timing synchronization of network devices, which are added or removed devices correspondingly entering or leaving the servicing area. Extensible Authentication Protocol (EAP) is an authentication framework frequently used in wireless networks and point-to-point connections. EAP-TLS (transport layer security) usually require client-side certificates without giving the option to disable the requirement. This requirement have the potential to dramatically reduce adoption of EAP-TLS and prevent "open" access points for clients currently lacking the network credentials. Without mutual authentication secured by network user credentials, such as a shared password and/or public-private key pairs and/or Protected Access Credential (PAC) and/or Universal Subscriber Identity Module (USIM) and/or Generic Token Card (GTC), and/or a third-party ECP (Encryption Control Protocol) certified software, the EAP method is vulnerable to man-in-the-middle attacks. However, requirement of pre-requisite user credentials and/or third party encryption software reduce the correspondent protocol adoption and inhibits a network growth, particularly in places lacking developed infrastructure.

Wireless communication devices, such as cell phones participating in a commercial and/or social network, GPS devices, etc. may exchange information with a cloud-based service (server) through IP network (such as 4G or 5G) using wireless application protocol. Numerous solutions have been proposed to facilitate location of persons or assets leveraging cellular and wireless devices and finding new clients for the network. However, schemes that forward wireless information indicating user identities or other unique information through out-of-the network devices may be tracked by unintended parties causing security concerns. For example, snooping device may capture radio messages that include user identities, public keys, etc., determine the origin of the messages by analyzing transmitting data and use this data maliciously (sniffing attack).

The mobile devices may communicate also using short-range communication (wire, Wi-Fi, Bluetooth, NFC, IR, etc.) that may be used for making transactions allowed exclusively to the members of the network or for limited number of devices in vicinity. Wi-Fi is a local area networking (LAN) wireless computer technology that allows electronic devices to connect to the network, mainly using the 2.4 GHz (gigahertz) UHF and 5 GHz SHF ISM radio band routers. Bluetooth is a wireless technology standard for exchanging data over short distances using short-wavelength UHF radio waves in the band from 2.4 to 2.485 GHz in a typical personal area network (PAN) range of 1, 10, or 100 meters. In vehicular networks, Dedicated Short-Range Communication (DSRC) at 5.8 GHz may be used. Near Field Communication (NFC) standards cover communications protocols and data exchange formats, and are based on existing radio-frequency identification (RFID) standards. A NFC-enabled device communicates with another NFC-enabled device via a RF signal, typically within the 125 kHz and/or the 13.56 MHz frequency band. A NFC-enabled device senses another NFC-enabled device when the two are located within a device's magnetic field, exchanging data between devices over about a small (typically 20 centimeter or less, preferably about 4 cm) distance. The described implementations require pre-established relationships between the user and the merchant within a limited-scale payment network; they are typically tied to a specific platform with preinstalled proprietary software. At that, RFID tags are vulnerable to skimming from greater distance than NFC range. In a larger and/or growing network, the untrusted merchant could redirect the transaction data to the third party, which can use it in a fraudulent transaction at a later time. Large centralized authentication systems are generally vulnerable to sniffing and replay attacks, in which a criminal makes a copy of the real user's features (such as transferred through short-range communication credentials) and later presents them to the authentication server.

Various financial transactions may be performed within secured private networks. Particularly, mobile payments, also referred to as mobile money, mobile money transfer, and mobile wallet generally refer to payment services operated under financial regulation and performed from or via a mobile device. A type of mobile payment known as digital wallet (also known as an e-wallet) allows users to make electronic commerce transactions with established in the payment network point-of-sale (POS) terminals. The term "digital wallet" is increasingly being used to describe applications residing on mobile devices that store a user's credentials (credit card, bank account, driver license, health insurance, travel document, keys and social media information) and online shopping information, utilize wireless technologies such as NFC to carry out transactions. For example, a digital wallet may contain credentials that link to an individual's bank account. Examples of mobile payment offerings include Google Wallet, PayPal OneTouch, Apple Pay, etc. Digital wallet protocol for a mobile device connectable with a secure transaction server (STS) can aggregate the mobile-enabled shopping experience and provide mobile phone authenticable cashless monetary transactions over mobile phone network. The amount of each transaction and RFID of the user's payee device may be forwarded from the POS terminal to the STS that can process the request identifying the particular wireless mobile device as well as the POS terminal participating in the transaction as trusted devices in the specialized payment network and then subsequently perform the requested transaction charging the correspondent user's account. However, the requirement of pre-requisite user credentials reduce the mobile payment adoption and inhibits a network growth. The amount and timing of the transaction may not be timely confirmed by the payee device that may be unacceptable for more complicated financial transactions.

The "handshake" may be proven if both parties (payer and payee in a case of mobile transaction or, more generally, seller and buyer during financial transaction) used issued by the STS public keys on corresponding devices, and their encrypted messages are forwarded to the STS. However, the messages from seller and buyer are unsynchronized. The transaction may become unsecure if the public key is issued only to one transaction participant or another participant may not be trusted. An imposter device intercepting the payee's communications could perform a fraudulent transaction at a later time because the transferred payer's public key can be compromised by deciphering the payee's message content. This problem is compounded if the payee mobile device possessing the payer's data is under the physical control of an unscrupulous or untrusted merchant who can maliciously redirect transaction and/or the payer's bank credentials. The centralized system also implies that the merchant should be pre-registered in the networks of its prospective customers; following this requirement is logistically complicated for small and one-time payments that is hindering spread of commercial networks, especially in rural and underdeveloped areas.

SUMMARY

In some examples, methods of network communications (such as secure identification of a message originator) are generally described. The method may comprise transmitting, from a first (such as originating) communication device to at least one second (such as confirming) communication device, an identifier in at least one secure inter-device communication (in some examples, a short-range communication accordingly to at least one of Near Field Communication (NFC), Bluetooth, Wi-Fi, and Infrared (IR) protocols). The methods may comprise processing, by at least one server, after authenticating at least one of the first and the at least one second communication devices, at least one request related to at least another of the first and the at least one second communication devices (the at least one another communication device may be prior authenticated or not), such as an authentication and/or authorization request. The methods may include, by the first communication device, sending, to the at least one server, a first identifier matching to the identifier in a first message. The method may also include, by the at least one second communication device, within a forwarding delay time after receiving the at least one secure inter-device communication, sending (forwarding), to the at least one server, at least one second identifier matching to the identifier in at least one second message. The method may also include, by the at least one server, receiving, from the first communication device, the first message; receiving, from the at least one second communication device, the at least one second message. The method also may include, by the at least one server, determining a sequence of receiving and a receiving time difference of the first and the at least one second messages, which contain mutually matching first and at least one second identifiers. The method may also include, by the at least one server, processing the at least one request (such as authenticating or rejecting the first or the at least one second communication device; authorizing or denying a financial transaction request, social network or conference status request, etc.) based on the sequence of receiving and on the receiving time difference, as compared to a receiving time difference threshold determined based on the forwarding delay time and/or secure inter-device communication transmission time.

In some examples of the method, the first message is sent no earlier than the at least one secure inter-device communication sending time; the sending time difference between the first message and the at least one secure inter-device communication is determined based on the forwarding delay time.

In some examples of the method, the sending time difference between the first message and the at least one secure inter-device communication is determined based on the secure inter-device communication transmission time. In some examples, the receiving time difference threshold is determined additionally based on the secure inter-device communication transmission time and a difference of the first and the at least one second communication transmission times.

In some examples, the receiving time difference threshold is at most 30 ms, as determined by the forwarding delay time and inter-device communication transmission time.

In some examples, the at least one secure inter-device communication is transmitted through at least one routing device (such as in LAN router or VPN routers). In some examples, the first message and the at least one second message may be sent, to the server, through a routing device.

In some examples of the method, the first communication device, such as a payer device, may additionally originate the at least one request, such as a financial transaction authorization request. The first communication device may transmit, at least partially, the at least one request to the at least one second communication device (such as in the at least one or another secure inter-device communication). The first communication device may send the at least one request to the at least one server (such as in the first or another message). The at least one second communication device, such as a payee device, may forward, at least partially, the at least one request to the at least one server (such as in the at least one or another second message, with, possibly, some additional request). The at least one server, such as a secure transaction server, may determine a sequence of receiving and a receiving time difference of the at least one request from the first and the at least one second communication devices. The at least one server may determine a sequence of receiving and a receiving time difference of the at least one request from the first and the at least one second communication devices. The at least one server may process (such as authorize or deny) the at least one request based on the sequence of receiving, the receiving time difference and the content matching of the at least one request (and, possibly, on the additional request content in the at least one second message).

In some examples, a network communication systems configured to securely identify a message originator (particularly, for device authentication and/or transaction authorization) are generally described. The system may comprise a means for transmitting from a first communication device to at least one second communication device at least one secure communication containing an identifier (in some examples, a short-range communication accordingly to at least one of NFC, Bluetooth, Wi-Fi, and IR protocols). The system may comprise at least one server (such as authentication and authorization servers) configured to process, after authenticating at least one of the first and the at least one second communication devices, at least one request related to at least another of the first and the at least one second communication devices, such as an authentication and/or authorization request. The system may also comprise a first communication device, at least one second communication device, means for at least one short-range communication between the originating communication device and the at least one confirming communication device. The first communication device may be configured to send to the at least one server, a first message containing a first identifier matched to the identifier. The at least one second communication device may be configured to send, to the at least one server, within a forwarding delay time after receiving the at least one secure inter-device communication, at least one second message containing at least one second identifier matching to the identifier. The at least one server may be configured to receive, from the first communication device, the first message and, from the at least one second communication device, the at least one second message. The server may be also configured to determine a sequence of receiving and a receiving time difference of the first and the at least one second messages, which contain mutually matching identifiers. The at least one server may be also configured to process the at least one request based on the sequence of receiving and on the receiving time difference, as compared to a receiving time difference threshold determined based on the forwarding delay time (which corresponds to the at least one second device characteristics) and/or secure inter-device communication transmission time (which corresponds to the at least one inter-device communication characteristics).

In some examples, the first communication device is further configured to establish the first message sending time no earlier than the at least one secure inter-device communication sending time; the sending time difference between the first message and the at least one secure inter-device communication based on the forwarding delay time.

In some examples, the at least at least one of the first and the at least one second communication devices may be additionally configured to forward to the at least one server data related to the at least another of the first and the at least one second communication devices, such as device location and credentials. The at least one server may be additionally configured to process the at least one request based on said data.

In some examples, the at least another communication device is attached to an identified object (such as to a vehicle in VAN, an IoT sensor, etc.).

In some examples of the system, the at least another communication device, such as point-of-sale (POS) terminal (a payee device without prior authentication) may be further configured to originate the at least one (financial transaction) authorization request. The at least one of the first and the at least one second communication devices (a payer device prior authenticated) may be further configured to confirm the at least one (financial transaction) authorization request.

In some examples, a network communication method for processing synchronized requests comprises transmitting, from originating (first) communication device to at least one confirming (second) communication device, at least one request (which may comprise an identifier), such as financial transaction request, in at least one secure inter-device communication and processing, by at least one server, after authenticating at least one of the originating and the at least one confirming communication devices, the at least one request.

The method may include, by the originating communication device, sending to the at least one server at least one first message containing at least one first request matching, at least partially, to the at least one request. The method may include, by the at least one confirming communication device, sending, to the at least one server, within a forwarding delay time after receiving the at least one short-range communication, at least one second message containing at least one second request matching, at least partially, the at least one request. The method may also include, by the at least one server, receiving, from the originating communication device, the at least one first message and, from the at least one confirming communication device, the at least one second message. The method may also include, by the at least one server, determining a sequence of receiving and a receiving time difference of the at least one first and the at least one second messages, which contain mutually matching at least one first and at least one second requests. The method may also include, by the at least one server, processing the at least one first and the at least one second mutually matching requests based on the receiving time difference, as compared to a receiving time difference threshold determined based on the forwarding delay time and/or secure inter-device communication transmission time.

The foregoing summary is illustrative only and is not intended to be in any way limiting. In addition to the embodiments and features described above, further illustrative aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings, all arranged according to at least some embodiments described herein, wherein like reference numerals are used to refer to like elements throughout. Any aspect of illustrated herein examples is not necessarily to be construed as preferred or advantageous over other aspects of design. While these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
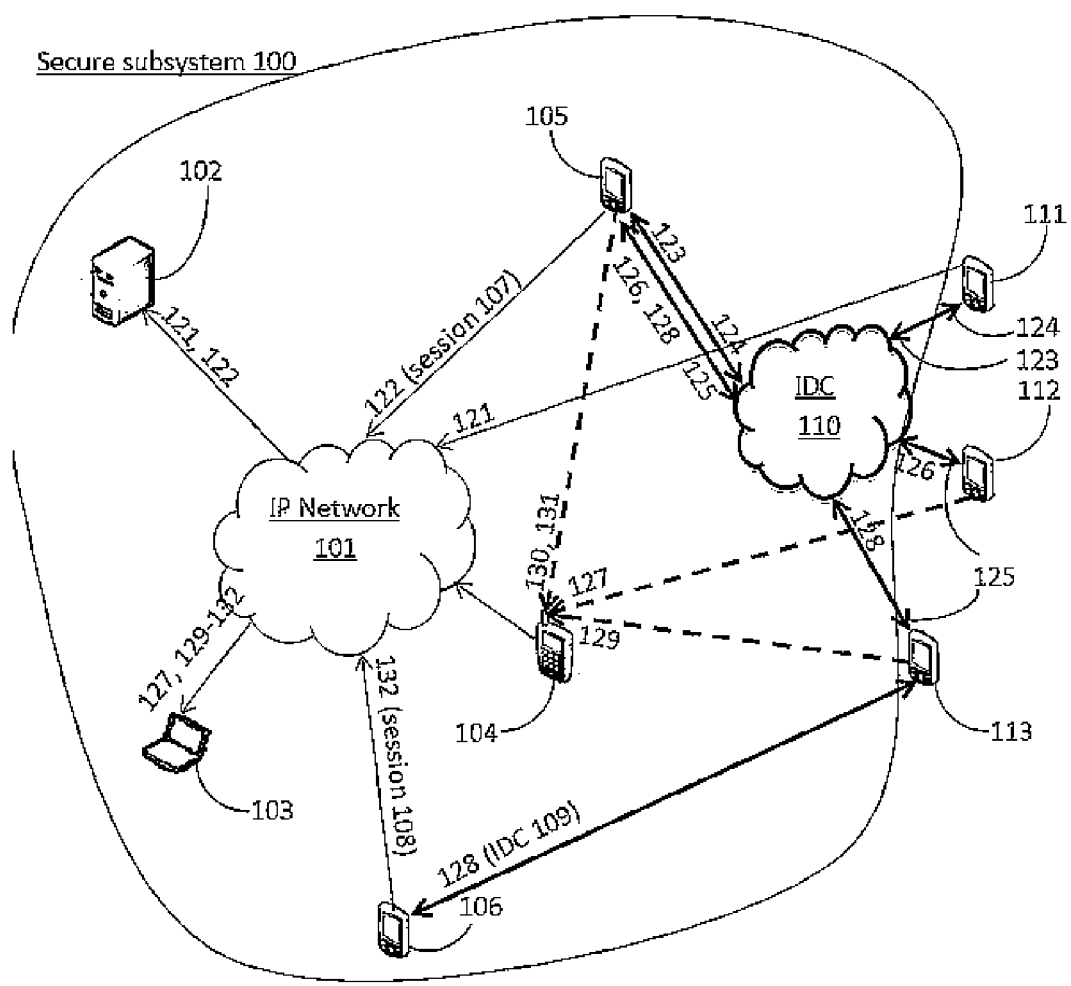
FIG. 1 illustrates an example system that can be utilized to secure identify a message originator in a mobile network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to secure identification of a message originator in a mobile network, particularly for device authentication with or without an additional request processing.

Briefly stated, technologies are described for methods and systems effective to authenticate at least one originating communication device in the mobile network comprising at least one server and a confirming communication device. In addition to or instead of requests for authentications, the processed requests may be related to requests for financial transactions authorization, status change in a social network, data exchange in a conference, data gathering in an Internet-of-Things (IoT) network, etc. As used herein, the terms "module" and "system" are intended to refer to a computer-related entity, either hardware (including hardware layer as well as operating system layer), software (including applications realizing protocols and interface methods), a combination of hardware and software, and software in execution (i.e. process) as related to a combination of hardware and software. For example, a module may be, but is not limited to being, a part of a computer, smartphone, or other device, a processor or a plurality of processors, a memory including storage (hard-drive disk, flash memory or other type of storage) and operative memory (on optical, solid state, and/or magnetic storage medium), a process running on a processor (a thread of execution or multiple threads), a computer program or an object of a program in a memory, etc. One or more modules may reside within a process or thread of execution, and a module may be localized on one device or distributed between two or more devices.

Use of described in this disclosure technologies improves security and ease of mobile communications, particularly of mobile transactions, allowing processing requests of devices with insufficient security status.

FIG. 1 illustrates an example system that can be utilized to implement secure identification of a message originator in a mobile network arranged in accordance with at least some embodiments described herein. The example system may include secure subsystem 100, which includes trusted devices with sufficient security status, and additional devices with insufficient security status. The secure subsystem 100 may be arranged as a network and/or setting of devices in an environment, in which data, information, and communications are managed. The features, services, and processes of the illustrative embodiments may be implemented by one or more elements of the secure subsystem 100 independently or as a networked implementation.

In one embodiment, secure subsystem 100 can be utilized to implement device authentication in an IP network 101 and may include one or more servers (request accepting devices, request evaluating devices, request processing devices, etc.), routing (networking) devices, and one or more trusted client devices (smartphones, tablets, laptops, personal computers, wearable and attachable devices, multi-mode devices, smartcards, other client mobile devices and elements) joined in the network 101. IP network 101 may include wireless networks, data network, cable network, satellite network, or other types of communication networks. IP network 101 may also include a secure service network (SSN), a social network, a vehicular network, an Internet-of-Things (IoT) network, medical provider network, etc.

In a case of a mobile IP network 101, it may also include hardwired connections (fiber optics, cable, DSL, Ethernet, etc.). Mobile network 101 comprises infrastructures (systems, towers, servers, etc.) for sending and receiving communications (messages, signals, etc.) according to one or more designated standards, formats, or protocols. Servers, particularly, may include remote secure server 102 and/or mobile server 103, such as a dedicated laptop or a cellular phone. A routing device, such as Wi-Fi router 104, may be configured to perform some server functions and/or some client device functions. Client mobile devices may include trusted device having IP network 101 credentials, such as at least one prior authenticated communication device 105, which may be configured to have Internet connection through mobile network 101 (such as cellular network such as 4G or 5G). The client devices may communicate with transition tower using widely accepted communication protocols, such as time division multiple access (TDMA), code division multiple access (CDMA), global systems for mobile (GSM) communications, also may be used personal communications systems (PCS), wireless local area network (WLAN), Wi-Fi, WiMAX, or other cellular or data communications protocols and standards. In some examples, secure subsystem 100 may include more than one trusted device—a routing device, such as Wi-Fi router 104, prior authenticated communication devices (such as cellular phones) 105, 106, and, in some examples, other trusted devices, which may be configured to be in communication with secure server 102 and each other through the mobile network 101. In other examples, communication device 106 may represent a tablet, a laptop provided with a communication module, a vehicular communication device, an IoT communication device, medical or another communication device. Trusted (second) communication device 105, after receiving a password and/or public key, may be configured to establish secure communication session 107 with secure server 102. The connection may be established through the cellular network or through Wi-Fi router 104. The mobile server 103 and trusted communication device 106 may be through wires and/or wirelessly connected with each other through the IP network 101. Trusted communication device 106 may be configured to establish secure communication session 108 with mobile server 103 through mobile network 101. The additional devices may be added to the mobile network 101. As discussed in more detail below, the trusted devices 105, 106 may be configured to authenticate additional joining secure subsystem 100 devices using secure inter-device communications (IDC) 109, 110 or using LAN communications through Wi-Fi router 104 or, in some examples, VPN communications. IDC 109, 110 may represent, particularly, a wired and/or wireless short-range link, such as established accordingly to Near Field Communication (NFC) and/or Bluetooth and/or Infrared (IR) protocols; or, in other examples, Wi-Fi or wired communications. The secure subsystem 100 may also include any number of other equipment devices, software modules, communication lines, or other computing communication elements. (IP network links are shown by solid lines; IDC 109, 110 links are shown by bold solid lines; LAN links are shown by dotted line.)

IDC 110 may be established between prior authenticated cellular phone 105 and at least another of communication devices 111, 112, 113, which may be prior unauthenticated mobile devices, such as smartphone, laptop, tablet, IoT or vehicular communication devices attached to sensors or vehicles, transaction point-of-sale (POS) devices, etc.

In one embodiment, the originating communication devices particularly may represent cellular phone (first communication device 111) with mobile payment application (or POS device with NFC connection), cellular phone with social networking (conference) application (first communication device 112) with Bluetooth connection, first communication device 113, which may be connected to sensors, appliances and systems, for example, to IoT (Wi-Fi or IR connection) and/or vehicular and/or medical sensors (Bluetooth connection). In some embodiments, originating communication device 113 may represent mobile IoT communication device (like cellular phone with Bluetooth connection), and the IoT sensors and appliances may be situated on a premises.

In some embodiments, originating communication device 113 may represent vehicular communication device, and, as well as sensors and systems, may be situated in a vehicle. In some embodiments, communication device 113 may represent wearable communication device, and medical sensors and systems may be wearable as well. IDC 109 may be established between mobile computer 106 and communication device 113. IDC 109 may represent a wired and/or wireless link with higher security level than one between communication device 113 and mobile server 103; particularly IDC 109 may represent a wireless link such as established accordingly to Bluetooth protocol.

In some instances of the method, one or more communication devices 111, 112, 113, as illustrated in FIG. 1, may be joining secure subsystem 100, but may not be situated within a same IDC range, such as within NFC range, typically requiring distance of 4 cm or less. At working distance up to 20 cm, more originating mobile devices may be in the range. NFC generally involves an initiator (communication device originating the transaction, further mentioned as originating communication device, which may be, for example, communication device 113) and a target (which may be, for example, at least one of trusted communication devices 105, 106). This may enable autonomous devices such as smartphones 105, 106 in NFC peer-to-peer communication (as well as Bluetooth peer-to-peer communication), and is possible when both devices are powered.

In some instances, the NFC initiator communication device 113 may actively generate a RF or IR field than can power a passive targets such as tags, stickers, key fobs, or smartcards that do not require batteries, and transaction confirmation may be reflected to trusted device 106 and forwarded to server 103.

In other instances, initiator, or originating communication device, may be at least one of trusted communication devices 105, 106, and joining communication devices 111, 112, 113 may be active or passive targets.

The authenticating may be based on two messages sent to secure server (STS) 102: a first message 121 sent from one of joining devices, particularly from mobile communication device 111, which is originating device in this case, and a second message 112—from at least one of trusted devices, particularly from mobile communication device 105, which is confirming device in this case. Time difference and/or sequence of receiving, the first message 121 and the second message 122, are determined. (Messages 121, 122 are represented in FIG. 1 by one-direction arrows corresponding to IP network 101 links).

The first message 121 may include at least one first request associated with the at least one originating communication device, particularly, an authentication request associated with the originating mobile communication device 111. The second message 112 may be sent as a part of a secure communication session 107 between the confirming mobile communication device 105 and STS 102. The NFC communication link 110 may be used for sending inter-device communications, particularly, secure inter-device message 123 from the originating mobile communication device 111 to the confirming mobile communication device 105. The secure inter-device message 123 may include at least partial content of the first message 121 (specified as an identifier). Sending times of first message 121 and inter-device message 123 may be mutually synchronized by the originating mobile communication device 111; at that the sending time, for example, of first message 121 may be randomized by the originating mobile communication device 111. In some instances, the synchronized messages 121, 123 may be sent at the same time or sent at a determined time difference; the message 121, 123 content may be entirely or partially identical. The second message 122 may be sent by the first mobile communication device 105 to secure server 102 in response to the inter-device message 123 receiving. The second messages 122 sent within a forwarding delay time of communication device 105 (if the at least one secure inter-device communication transmission time is sufficiently lesser) may include at least partial content of the inter-device message 123 and, correspondingly, of the first message 121, i.e. the second identifier, which is matched to a first identifier contained in the first message 121.

In some examples, the first message 121 generated by the originating mobile device 111 may contain a first identifier randomly generated by device 111, such as a token. The first message may also contain a timestamp, and/or security attribute, which may be "0" for the external network device message. The first identifier may also include an identification that identifies the originating mobile communication device 111 such as a media access control (MAC) address and/or international mobile subscriber identity (IMSI). In some examples, the identifier also may include IP address and/or network name of communication device 111. Correspondingly, the second message 122 may include the token randomly generated by second mobile communication device 111, and/or a timestamp, and/or security attribute. The second message 122 may also include a network identification and/or IP addresses of the confirming mobile communication device 105. Secure server 102 may be configured, in response to receiving messages 121, 122, to determine the sequence of receiving and compares the first and the second identifiers and contents of said messages (of the first and the second requests). Secure server 102 may be configured to authenticate the originating communication device 111 based on the sequence of receiving and the content, particularly the identifier token, matching of messages 121, 122. If the second message 122 generated by the confirming mobile communication device 105 was received by secure server 102 within an allowable delay (receiving time difference threshold determined based on the forwarding delay time) after the first message 121 generated by the originating mobile device 111. In a preferable embodiment, the message 121, 122 content is at least partially identical, for example, the messages include the same token and request, and if this condition is met, the second mobile device 111 may be authenticated.

In some embodiments, after establishing secure communication session 107 with the confirming communication device 105, which already has had validated certificate, the remote secure server 102 may be capable of issuing and revocation of digital certificates and public security keys through the IP network 101 connection using initial security key shared through trusted devices. Particularly, devices 105, 111 may mutually authenticate each another using IDC 110 (for example, Bluetooth and/or NFC) protocol with initial security key displayed simultaneously on displays of the devices for additional verification. As those skilled in the art may appreciate, confirming communication device 105 may be configured to authenticate originating communication device 111 using means of communicating additional information, for example, optical or infrared (IR) sensor, etc. Through the IDC 110, the originating communication device 111 may receive encryption protocol, initial encryption information (i.e. initial key) with initial inter-device message 124, and communication devices 112, 113—with initial inter-device message 125. Secured IDC 110 links may have a higher level of security than trusted IP network 101 links. In some embodiments, using secured IDC 110, devices 105, 111 may be, according to corresponding protocol, securely paired one with another, preferably in close proximity, and/or mutually authenticated with generating a common cryptographic key and/or issuing pairwise symmetric keys. Internal clocks of devices 105, 111 may be or may be not mutually synchronized for further confirmation procedures.

In an example, after initiation secure communication session 107, at 15:38:12.550, the originating communication device 111 randomly generates first message 121 sending time, e.g. 15:38:13.200 (i.e. 0.25 seconds later) and sends encrypted data in first message 121 at said sending time. The same data may be sent in inter-device message 123 in synchronized manner with the first message 121 and then forwarded by the confirming communication device 105 in second message 122. Encrypted data in first message 121 may include a randomly generated token and/or additional data such as identification (such as network names and/or IP addresses of confirming communication device 105 and/or originating communication device 111, etc.), and/or a timestamp and/or a security attribute. Originating communication device 111 may send first message 121 to secure server 102 at a first sending time, e.g. 15:38:13.200. Confirming communication device 105 may send second message 122 to secure server 102, as a response to receiving the inter-device message 123, at a second sending time, e.g. 15:38:13.210, i.e. 10 ms after the first sending time. In some instances, the difference between the second sending time and the first sending time (a forwarding delay time) and, correspondingly, between receiving times of messages 122 and 121 may be 5 . . . 15 ms, which is less then allowable delay, for example, 21 ms threshold. Secure server 102 may authenticate originating communication device 111 based on messages 121, 122 content match, such as token, identifiers (network names, IP addresses, etc.) match, and/or on corresponding receiving times of messages 121, 122. Based on a sequence of receiving time of messages 121, 122, such as 15:38:13.221 and 15:38:13.231 (e.g. the second message 122 received 10 ms after the first message 121 within allowable 21 ms, i.e. 0.021 s, time difference threshold), secure server 102 may authenticate the originating communication device 111. Secure server 102 may send a digital certificate to the originating communication device 111 in an encrypted communication. The encrypted communication may include a time interval, for example, of 30 minutes corresponding to the expiration time of digital certificate. The digital certificate and secure session 107 may expire at 16:08:13.000 and secure server 102 may revoke the digital certificate from the originating communication device 111 at 16:08:13.000, sending corresponding message to the secure confirming communication device 105. The secure confirming communication device 105 may thereafter repeat initiating secure session 107 and starting the process of authenticating of the originating communication device 111 by sending an initial inter-device IDC message 124, in order to establish, by the at least one originating communication device, in response to receiving the at least one initial inter-device communication, the sending time difference threshold. The secure server 102 may comprise an application for calculating risk of connection to each authenticated communication device 111, 112, 113 based upon type of said security attributes. Secure server 102 may also be configured to send to the trusted devices, such as communication device 105, which is also may be configured to send to originating communication devices 111, 112, 113, public key authorizing access to the secure subsystem 100 devices. If the periodically calculated risk of spoofing, for example, the communication device 111 authenticity is more than allowed risk for secure subsystem 100, the IDC 110 link between the confirming communication device 105 and the originating communication device 111 should be re-established; the originating communication device 111 should be authenticated by secure server 102 again based on receiving of a new set of messages 121, 122. Such system provides security and flexibility of second mobile device connection relying not exclusively on higher-level server security (such as password, biometric, etc.) but mostly on secure inter-device connection 110, largely avoiding possibility of spoofing its identity during initial information transmission by the securely paired devices 105, 111 to the remote server 102.

After sending secure inter-device message 124, the authentication process may be repeated, at that trusted communication device 105 is a first (originating) communication device and authenticated communication device 111 is at least one second device.

In some examples, through pre-established link of inter-device communication (IDC) 110, which may be a NFC link, an initial inter-device message 124 may be sent from the confirming communication device 105 to the at least one of communication devices 111, 112, 113. Inter-device message 124 may include data necessary for generating of at least part (the part associated with the trusted communication device 105) of the request to authenticate mobile device 111 and/or of the request to authorize transaction or status change. In some examples, said data may include an identification of trusted communication device 105 (such as IP address and/or its other network credentials), IP address of secure server 102, an instruction, and/or a timestamp. Inter-device message 124 may also include a token generated by the trusted communication device 105 randomly. Message 122 may comprise a first identifier identical to the token in inter-device message 124. Message 121 may comprise a second identifier forwarded by the mobile device 111 and/or the authentication request including said data (at least the second token and/or the transaction authorization request including necessary transaction data and/or additional token generated by the second mobile device 111 and/or timestamp). Inter-device message 123 may comprise at least the first and the second tokens. STS 102 may authenticate the originating communication device 111 and/or authorize the transaction based on the sequence of receiving, message 122 after message 121 within allowable receiving time difference threshold, which may depend also on security attributes, and on the matching content, particularly tokens, of messages 121, 122.

Among other possible benefits, the system in accordance with the disclosure may benefit users of mobile network. For example, users in an event such as a conference may desire to share information, such as business contacts, with each other by transmitting electronic data using respective personal devices such as cellular phones. A system in accordance with the disclosure may enable users in such events with the ability to determine if a presumably joining device may be trusted and if data may be shared with the joining device. A system in accordance with the disclosure may reduce an amount of authentication resources and/or time by allowing secure server in the mobile network to authenticate a joining device using a secure device within the network.

In some instances of the network communication system, secure mobile server 103 may establish trusted IP network 101 links with at least one trusted (confirming) communication device 105 and at least another communication devices 112, 113 through routing device 104, which may also have some server functions. The communication devices 105, 112, 113 may have downloaded connectivity application from mobile server 103 with the processing instruction. The mobile server 103 may be provided with a controlling computer program for accepting or rejecting connection to at least another communication device 112, 113 after receiving corresponding message pairs, 127 and 130, 129 and 131 through routing device 104. The processing may be based on receiving time sequence for each pair by secure routing device 104. Through pre-established links of inter-device communication (IDC) 110, which may be Bluetooth links, inter-device message 125 may be sent from the confirming communication device 105 to communication devices 112, 113 simultaneously. Message 125 may include data necessary for generating two authentication requests for second mobile devices 112, 113. In example of joining a conference administrated by mobile server 103 with participation of trusted (confirming) mobile devices 105, 106, said data may include an identifier, IP address of the confirming communication device 105, and/or a timestamp.

In some instances, the communication devices 105, 112, 113 may previously be authenticated and included in LAN or VPN. The method may be used when authorization request processing is required, which may be implemented by synchronized request processing from originating and confirming devices, such as for financial transaction requests, social network status change requests, data requests, etc. Secure inter-device messages 126, 128 may be sent through IDC 110 to confirming communication device 105 and may contain identifiers and data necessary for the authorization requests. Messages 126, 127 sent from the originating communication device 112 and messages 128, 129 sent from the originating communication device 113 may comprise a copies of identifiers and authorization requests. Each of messages 130, 131 may be sent by the confirming mobile device 105 as a response to receiving of, correspondingly, secure inter-device messages 126, 128 with forwarding identifiers and correspondent authorization requests. Wi-Fi connection of devices 105, 112, 113 may be established through Wi-Fi router 104, which may receive message pairs 127, 130 and 129, 131 and transmit them through network 101 to mobile server 103. In some instances, mobile server 103 may authorize the transaction based on the sequence of receiving and the content matching within message pairs 127, 130 and/or 129, 131 correspondingly.

In some instances of the network communication system, when the communication devices 105, 112, 113 form LAN, secure inter-device messages 126, 128 may be sent through Wi-Fi routing device 104. In a case when secure subsystem 100 comprises VPN, secure inter-device messages 126, 128 may be sent through Wi-Fi routing device 104 and other VPN routers.

The confirming mobile device 106 further may be configured to receive the message 128 through IDC (such as LAN) 109 and to forward it in message 132 to mobile server 103 in order to change the originating communication device 113 status, if the receiving time difference of messages 129, 132 is not larger than a threshold, for example 10 ms, based on the forwarding delay time for mobile device 106 and on message transmission time through IDC 109. Mobile server 103 may be configured to process the request for joining the conference and changing the corresponding device status. (Wi-Fi router 104 links are shown in FIG. 1 by bold dashed lines, with messages 127, 129-131 represented by bold dashed arrows. Messages 123-126, 128 are represented in FIG. 1 by bold solid arrows corresponding to IDC 109, 110 links).

In another instance of the network communication system, users in a vehicular ad-hoc network may benefit from a system in accordance with the disclosure. Users who are operating respective vehicles with respective devices such as cellular phones may determine if a roadside apparatus, or other vehicles inside of the vehicular ad-hoc network with data provided by devices and systems such as GPS (global positioning system), camera, radar (local or relative positioning system), navigation system, may be trusted. For example, a first user operating a first vehicle with a confirming (currently trusted by a secure server) communication device may inquire about traffic conditions on the road ahead. A second user operating a second vehicle with an originating communication device may receive the inquiry. The second user may use the originating communication device to provide the traffic conditions to the first user and to the secure server or another communication device. The first user may determine, using methods discussed herein, if the information received from the second user may be trusted and forward it to the secure server. In another example, the first user may inquire about a route to a destination. A user outside of the vehicular ad-hoc network may perform a network attack and provide falsified instructions to the first user. The first user may decline to trust the falsified instructions and to forward it to the secure server or another communication device based on the results of an implementation of a system in accordance with the disclosure.

In some instances of the ad-hoc network communication system, the confirming communication devices 105, 106 and/or originating communication devices 112, 113 may be located in a corresponding vehicles (and/or, in some examples, in an infrastructure, e.g. roadside apparatus) as communication devices forming a vehicular network. IDC 109, 110 between the communication devices may be established according to the network protocol, such as enhanced Bluetooth links. IDC 110 may be used for sending secure inter-device communications, particularly, inter-device messages 126, 128. Communication device 113 may originate two identical messages 128, sent simultaneously to confirming communication devices 105, 106. Routing device 104 may be located in a roadside tower, and use Dedicated Short-Range Communication (DSRC) at 5.8 GHz, which may be also used for vehicle-to-vehicle (V2V) and vehicle-to-infrastructure (V2I) communications. The vehicles carrying communication devices 105, 106, 112, 113 may be equipped with relative positioning sensor (e.g. infrared sensors and/or electronic stereoscopic cameras and/or radars and/or lasers for capturing images of objects, determining distance to objects, etc.) and/or a global positioning system (GPS) units. A monitoring (piloting) unit may be also included in a vehicle positioning system. A relative positioning sensors installed on vehicles of communication devices 105, 106, 112, 113 may be configured to be in communication with each other to additionally protect secure IDC 109, 110 links. Routing device 104 may be configured to receive message pairs 127, 130 and 129, 131 and transmit them through IP network 101 to a dedicated remote server, such as secure mobile server 103. Mobile server 103 may authenticate the originating communication devices 112, 113 based on the sequence of receiving, receiving time difference and the content matching within message pairs 127, 130 and 129, 131 correspondingly and process the request for joining the vehicular network.

In some instances, routing device 104 may be configured to establish the time and the sequence of receiving message pairs 127, 130 and 129, 131 and send this information to mobile server 103. The mobile server 103 may authenticate the originating communication devices 112, 113, if, at the correspondent sequence (receiving message from confirming device after the originating communication device), the time difference is not larger than a threshold, for example 30 ms, which is determined by the forwarding delay time of confirming device 105.

In some instances of the system, a cellular phone may be configured as a trusted communication device 105 of Internet-of-Things (IoT) system. The joining communication devices 112, 113 may be disposed on IoT items as communication devices forming an IoT network. Short-range IDC 110, for example low-energy Bluetooth and/or IR (such as optical light-emitting diode (LED)—photodiode link), between communication devices may be established and may be used for sending inter-device communications. In one example, inter-device communications 125, 126, 128 may be performed by means of Bluetooth communication supported by the optical communication. The routing device 104 may be additionally configured to irradiate infrared light, which may be reflected by bar-code strips situated, correspondingly, on joining communication devices 112, 113, and detected by IR sensors situated, correspondingly, on device 105, confirming location (coordinates) of communication devices 112, 113. In some instances, RF trusted device 105 may be supplemented by passive targets reflecting RF signal from joining devices 112, 113 and by RF sensor connected to trusted device 105. In such a way, cellphone 105 may be successfully paired with joining devices 112, 113 for sending synchronized message pairs 127, 130 and 129, 131 to mobile server 103 accordingly to the present invention, thus preventing possibility of man-in-the-middle attack.

In another embodiment, RF devices 105, 112, 113 may be configured to send and the routing device 104—to receive Wi-Fi or wired communications 127, 129, 130, 131 in correspondence with Message Queue Telemetry Transport (MQTT) protocol. The routing device 104 may be also configured to perform partially a server functions in order to authenticate the originating communication devices 112, 113 based on the sequence of the receiving of messages 127, 130 and messages 129, 131. Data from communication devices 112, 113 sent through the routing device 104, IP network 101 to secure mobile server 103 by communication devices 112, 113 having IPv6 addresses and, separately, forwarded by confirming communication device 105 may be used for authenticating the originating communication devices 112, 113. Rejecting by server 103 request from originating devices not paired with confirming devices may prevent DOS attack. In more complex systems, using synchronized messages form paired devices according to the present invention may prevent DDOS attacks.

Due to the system configuration providing simultaneous sending, by the joining device, an inter-device message to the trusted device and a first request message to the secure server, the second confirmation message can be forwarded within limited period after the first communication. Therefore, if the first message from a joining device is intercepted by an imposter device, it technically cannot be received by the secure server before the second message, and the fraudulent authentication request will be rejected by the secure server. The system allows additional security and flexibility by using any network device as a trusted network node with issuing key-pairs in each case, which is secure as long as the trusted device is secure because said joining device and the network node, after been synchronized, separately and simultaneously generate random numbers encrypted using said key for establishing the broadband communication time for both paired devices thus confirming the joining device identity by comparison of the receiving times and receiving time delay.

Figure 2:
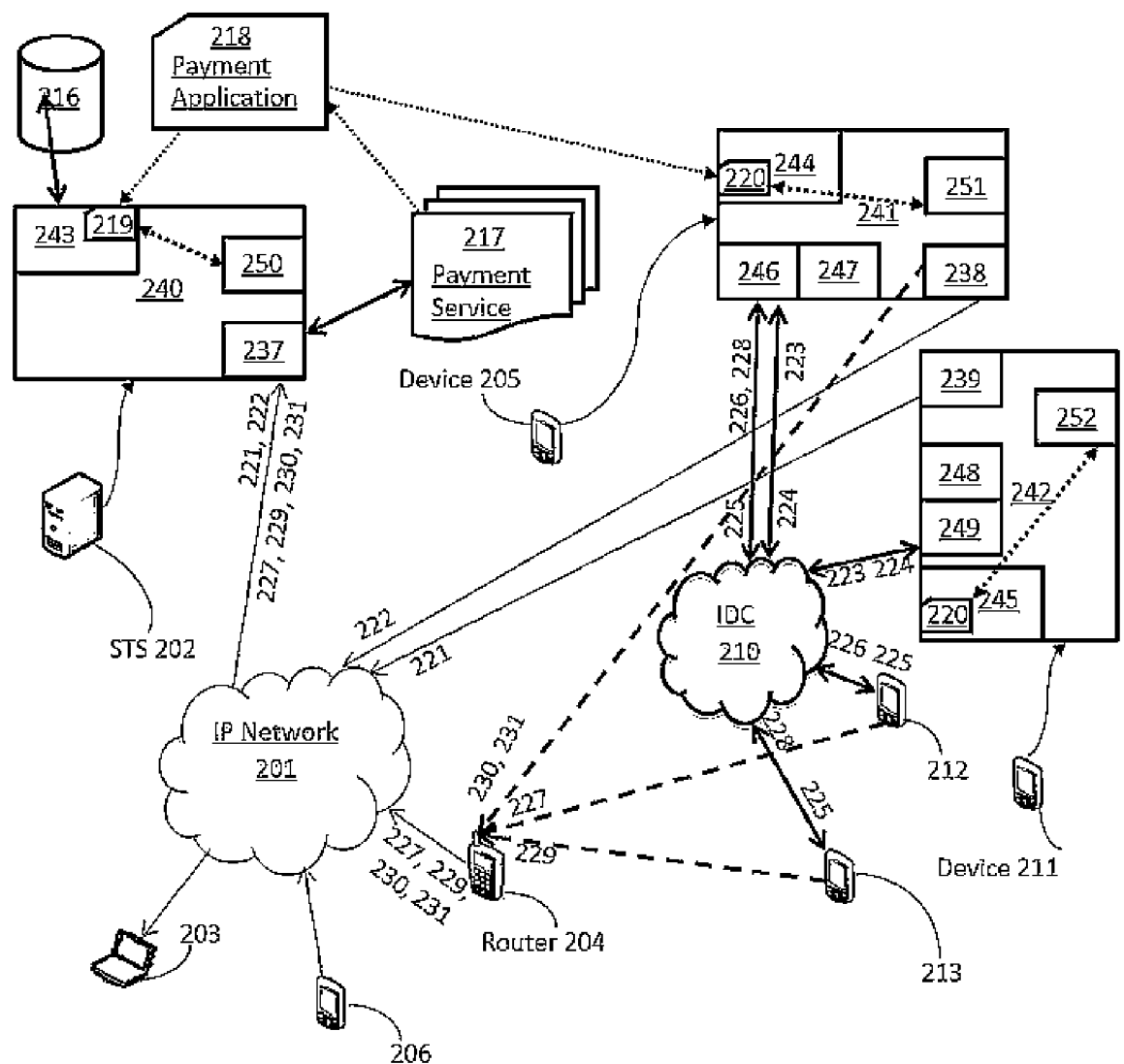
FIG. 2 illustrates the example system with added functionality for payment request processing in the mobile network, particularly in Secure Transaction Network (STN), with additional detail relating to network devices.

An example system, which may be utilized in Secure Transaction Network (STN), which is as a part of mobile Internet Protocol (IP) network 201, is shown in FIG. 2 with additional detail relating to secure transaction server (STS) 202, confirming communication device 205, and originating communication device 211. The system shown in FIG. 2 has sufficient similarities to system 100 of FIG. 1, with additional functionality related to payment authorization request processing, The STN payment protocol offers a vessel to securely carry the information of a transaction agreement from each individual party (payer, payee) involved in the transaction to a trusted third party (STS) for verification using a general communication network, which may include insecure segments such as WLAN or cellular links. The confirming mobile device 205, which may be wireless wallet or secure payer device, can support wireless communication capabilities necessary for discovering and interfacing via short-range secure communications (IDC) with originating (payee) mobile devices 211, 212, 213, which may be or may be not external to the STN point-of-sale (POS) terminal, wireless wallet, etc.

In other examples, confirming device 205 may be a payee device (for example, a merchant's mobile phone or POS terminal), and originating devices 211, 212, 213 may be a payer cellphone, wireless wallet, etc.

The system may comprise Secure Transaction Server (STS) 202, payer devices 205, 206 connected, particularly, within the STN as a part of IP network 201. The confirming communication devices 205, 206 are configured to establish secure communication sessions with STS 202 and mobile server 203 correspondingly. STN insures that authenticity of the parties is verified and the privacy of transactions and that one transaction participant's data is preserved even if the another one may not be trusted. Transactions between the secure confirming communication device 205 and transaction originating device 211 is supported by remote STS 202 housing secure database 216, which is assumed to be situated in a protected facility and inaccessible from the network without authorization. Transaction originating device 211 may be or may be not prior authenticated. STS 202 is securely connected to at least one payment service 217 (which may be represented by a number of financial institutions). Payment application 218 may be downloaded and constantly upgraded from payment service 217 site and installed to STS 202 memory 243 as an application comprising STS protocol 219 and to confirming (trusted) device 205 memory 244 as an application comprising user protocol 220. Secure communication paths, particularly, connecting the STS 202 and the payment services 217 may have a high security level and be used for said payment application 218 upgrades (shown by dotted arrows) and for user data exchange (shown by bold solid arrows). STS 202 may be connected with communication devices 205, 211 through one or more mobile network 201 connections (such as Internet connections through 4G or 5G wireless network). The payment application 218 comprising the user protocol 220 may be downloaded, through mobile network 201 links, to secure confirming communication devices 205, 206 and, before the transaction it may be downloaded also prior authenticated communication device 211. (In some examples, the payment application may be downloaded to transaction originating device 211 prior to authentication).

In other examples, confirming transaction communication device 205 may be untrusted and originating communication device 211 may be trusted device; or both participating communication devices 205, 211 may be trusted, but transaction amount and time confirmation is required.

The payer and payee communication devices 205, 211 (or their agent devices) may have a secure short-range IDC 210 connection (such as Bluetooth and/or NFC, and/or local area network) established between them. Said IDC 210 may enable exchanging secure inter-device communications 223, 224 between the communication devices 205, 211, which communications may comprise a few messages each and may be used to negotiate details of cashless payment transactions. STS 202, secure confirming (second, payer) communication device 205, and joining or joined mobile network 201 originating (first, payee) communication device 211 may correspondingly include IP communication modules 237, 238, 239 for broadband wired or wireless network connection through mobile IP network 201, enabling communication 221, 222 from payer and payee devices 205, 211 to STS 202. IPv6 communication modules 238, 239 may include but are not limited to an air interface for radio-frequency (RF) based communication links such as wireless cellular interface with a cellular network, a Universal Serial Bus (USB), Ethernet interface. In some embodiments, a wireless local area network (WLAN) may be used for broadband wireless network connection. RF signal may be conveyed by a wireless communications medium (e.g. conforming to the IEEE 802.11 standard), which may be incorporated into IPv6 communication modules 238, 239. An example IP communication module includes a network controller, which may be arranged to facilitate communications with one or more other computing devices over a network communication link via one or more communication ports.

STS 202, secure confirming communication device 205, and originating communication device 211 may further include, correspondingly, processors 240, 241, 242 and/or a memories 243, 244, 245. Secure confirming communication device 205 and originating communication device 211 may further include, correspondingly, NFC modules 246, 247 and Bluetooth modules 248, 249 supporting corresponding communication protocols. NFC modules 246, 247 may include NFC protocol stack prescribing hierarchy of software layers, NFC controller, RFD-compatible secure element, etc. Modules 248, 249 may support as a Bluetooth wireless interface as well as, in other embodiments, a wireless local area network (WLAN), an optical (including IR) interface, etc. Processor 240 may be configured to be in communication with memory 243 and/or Internet communication module 237. In some examples, communication module 238 of secure confirming communication device 205 may be a part of processor 241. In some examples, communication module 239 of originating communication device 211 may be a part of processor 242. Memories 243, 244, 245 may store protocols 219, 220 which may be invoked along with Graphical User Interface (GUI) 250, 251, 252, for execution, correspondingly, by processors 240, 241, 242.

Processor 241 of secure confirming communication device 205 may be configured to access protocol 220 and data in memory 244, particularly to protocol 220 and data received with communication 223. Processor 241 may further store and/or retrieve data from memory 244 in response to instructions in protocol 219 in order to generate communications 224, 225. In some examples, protocol 220 invoked by processors 241, 242 may include a random number generator for tokens, which may be sent in communications 222, 221 by IP communication modules 238, 239 correspondingly. Processor 242 of originating communication device 211 may randomly generate the first communication 221 sending time. Processors 241, 242 of communication devices 205, 211 may be configured to generate encrypted content of communications 221, 222 based on received from STS 202 encryption (public key, and/or generated private-public key pairs) as a part of protocols 219, 220. Processors 241, 242 may be configured to send encrypted content of communications 221, 222 to IP communication modules 238, 239. Communication module 237 may be configured to receive and processor 240—to decrypt, according to protocol 219, the content of communications 221, 222 to recover the authentication and the transaction authorization requests.

In some examples, such as initial authentication of joining (in this example, a payee) communication device 211, trusted (in this example payer) communication device 205 may become a first communication device transferring an initial invitation inter-device communication 224 through secured IDC 210 link from NFC module 246 to NFC module 247 of joining (payee) communication device 211, which may become, correspondingly, a second communication device. Inter-device communication 224 may include standard TCP/IP and/or DNS (domain name service) of STS 202 and/or network credentials (an identification) of secure confirming communication device 205 and/or at least one first token (for authentication and transaction authorization purposes) randomly generated by processor 241 of secure confirming communication device 205 and/or an instruction according to protocol 220, which may be saved in memory 245, and/or timestamp data. Processor 240 of STS 201 may accept or reject authentication request forwarded by processor 242 of payee communication device 211 based on the sequence of receiving and receiving time difference the corresponding messages from first and second communication devices 205, 211.

In some examples, the joined or joining (payee) communication device may be a first, or originating, communication device, and trusted confirmed (payer) communication device may be a second communication device. Transmitting time and forwarding time may be determined by processor 242 of originating communication device 211 by using echo-effect; and an approximate forwarding delay of inter-device communication 223 by confirming communication device 205 in order to schedule, by processor 242 of the originating communication device 211, the sending time of the at least one inter-device communication 223 with respect to the first communication 221.

For example, at inter-device communication transmission time 15 ms and forwarding delay 3.0 ms, the sending of the first communication 221 may be delayed with respect to sending time of inter-device communication 223, which may be randomly generated by processor 242, by 3.0 ms, in order to receive, by STS 202 IP communication module 237, the second communication 222 after the at least one first communication 221 in about 15 ms. With standard deviation (an averaged difference) of transmission times of communications 221, 222 about 10 ms, the actual receiving delay within the standard deviation would be 5 . . . 25 ms, the second communication after the first communication, which is within an allowable delay threshold, for example, 25 ms. (In the example, the time periods are given in milliseconds and may be determined by the device characteristics).

First communication 221 may be sent from IP communication module 239 of originating communication device 211 in response to receiving invitation inter-device communication 224 and may consist of one message or separate messages for authentication and transaction authorization generated by processor 242. First communication 221 may comprise requests for authentication of the originating communication device 211 and/or for the authorization of the transaction between devices 205 and 211. The authentication request may include the first token generated by secure confirming communication device 205 and other invitation inter-device communication 224 data and/or an identification of originating communication device 211, such as name and physical address, and/or identification-related second token randomly generated by processor 242 of originating communication device 211 for the authentication purposes. The first communication 221 may also comprise the transaction authorization request, including necessary transaction data (amount of transaction, for example in dollars, payee and payer data, for example payer network identification and payee account, etc.), and/or randomly generated transaction-related second token and/or timestamp. Inter-device communication 223 may be sent from NFC module 247 of the originating communication device 211 to NFC module 246 of secure confirming communication device 205 in synchronized manner with the first communication 221. Inter-device communication 223 may consist of separate messages for authentication and transaction authorization or of one message and may comprise the second tokens generated by processor 242, correspondingly, identification-related and/or transaction-related. Inter-device communication 223 may also comprise an identification of the originating communication device 211 and/or the transaction data. As those skilled in the art may appreciate, inter-device NFC communications 223, 224 may be additionally protected by Bluetooth communication (communications) between Bluetooth modules 248, 249 of devices 205, 211. The processor 241 of secure confirming communication device 205 may forward said content of inter-device communication 223 in second communication 222 consisting, correspondingly, of one message or separate messages for authentication and transaction authorization validating corresponding messages of first communication 221. Second communication 222 may be sent from IP communication module 238 to IP communication module 237 of STS 202. Processor 240 of STS 202, according to protocol 219, may retrieve the identification, determine the sequence and time difference of receiving of communications 221, 221 and authenticate the originating communication device 211 and/or authorize the transaction based on the sequence of receiving, second (validation) communication 222 after first (request) communication 221 (or the sequence of receiving of corresponding separate messages) within allowable receiving time difference threshold, according to protocol 219, for example 0.0031 s (3.1 ms), and on the content, particularly token, matching in communications 221, 222. In some examples, the delay threshold may have a different value depending on the particular type of secure confirming communication device 205 in IP network 201 communicating with originating communication device 211. Processor 240 may execute instructions in protocol 219 to determine a sequence and a time difference between receiving times of first and second communications 221, 222. If the sequence of the receiving of the communications is 221, 222, but the time difference is not within the allowable delay threshold or matching of the communication content is not confirmed, then originating communication device 211 authentication may be rejected. If the matching of the transaction-related content of the communications 221, 222 is not confirmed, then the transaction authorization may be rejected.

In an example, the routing device 204 may be used for transmission of communications of conference participants, then deviation of first and second messages transmission time may be negligible (less than 1 ms). User application with instructions in protocol 220, which may be included in inter-device communication 225 from secure confirming communication device 205 to originating communication devices 212, 213 (or may be downloaded from STS 240), may include a threshold as small as 3.1 milliseconds, The threshold depends on the forwarding delay of inter-device communication 226 by secure confirming communication device 105 and on the transmission time of inter-device communications 226, 228 from, correspondingly, second (joining conference) devices 212, 213, requesting for payment to participating secure confirming communication device 205. If processor 241 of secure confirming communication device 205 is busy with other operations, the forwarding delay for sending second (confirmation) communications 230, 231 by IP communication block 238 would be more than 3 ms, for example, 10 ms. At inter-device communications 226, 228 transmission time 1.5 ms and time difference of sending the second (validating) communications 230, 231 after the first (request) communications 227, 229 4 ms, IP communication block 237 of STS 202 may receive second (validating) messages 230, 231 after first (request) communications 227, 229 in 10.5 ms. Processor 240 of STS 202 may determine a sequence of receiving and a time difference of 10.5 milliseconds between receiving times of communications 230 and 227, as well as 231 and 229. Processor 240 may analyze instructions in protocol 219 and determine that the time difference of 10.5 ms milliseconds is larger than the threshold of 3.1 milliseconds determined by the normal forwarding delay time and the secure inter-device communication transmission time. Processor 240 may decline to authenticate devices 212, 213 and, correspondingly, decline payments from these devices. After that, the request procedure may be repeated.

In an established according to instruction of protocol 220 period of time after the authentication rejection, for example in 3 seconds, each of originating communication devices 211, 212 may randomly determine new communication sending time. Processor 240 of STS 202 may determine a new sequence and a time difference, for example of 1.5 milliseconds between receiving times of communications 230 and 227, as well as 231 and 229. Processor 240 may analyze accordingly to instructions in protocol 219 and determine that the time difference of 1.5 ms milliseconds is not larger than the threshold of 3.1 milliseconds. Processor 240 may authenticate devices 212, 213 and, correspondingly, authorize payments from these devices. Processor 240 may send digital certificates to originating communication devices 212, 213 to indicate authentication of originating communication devices 212, 213. Processor 240 may determine an expiration time of the digital certificates 260 sent to originating communication devices 212, 213.

In some examples, the transaction request processing in the Secure Transaction Network (STN) accordingly to FIG. 2 may be described as following. Preliminary, a secure transaction server (STS) 202 may provide a payee first (originating) mobile communication device 211 with authentic mobile payment software having a software authentication parameter (SAP) and a personal key from a financial services provider via a SMS message and/or a download link. At first communication device 211, a password and/or biometric information may be entered in order to establish a first secure communication session between STS 202 and first communication device 211; an additional temporary personal key may be provided in order to transfer to a second (confirmation) communication device. The first communication device 211 may establish an exclusive secure (preferably local, such as NFC, Bluetooth, or wired link) inter-device connection 210 with second communication device 205. The first communication device 211 may generate and transfer through the inter-device connection 210 to second communication device 205 the inter-device message containing IP address of the STS 202. The public key also may be transferred in order to encrypt messages from the second communication device 205 to STS 202. STS 202 may provide payee communication device 211 with a downloading link from the financial service provider and with a temporary SAP in order to transfer to the second communication device. First (payee) communication device 211 may randomly generate an authentication token and, at a randomly selected time, sends via the inter-device connection 210 to second (payer) mobile device 205 inter-device authentication message 223 containing the authentication token, identification and timestamp. Simultaneously or in a determined period of time within the sending time difference threshold, first communication device 211 may send through 5G network to STS 202 first authentication request message of first communication 221 containing the authentication token, identification and a timestamp; the first message may be encrypted using the temporary payee SAP and the public key. Second mobile device 205 forwards the authentication token in a second authentication confirmation message of second communication 222 to STS 202; the message may contain the payer identification and correspondent timestamp and may be encrypted using the payer private key and SAP. Based on the sequence of receiving (the second message after the first message) and on matching of deciphered authentication tokens (identifiers) in the first and second messages (matching content), and upon establishing correspondence of the receiving time difference to transmission delays of the first and second messages (not exceeding an allowable receiving time difference threshold condition) and to timestamps, the STS 202 makes decision about authentication of the second device 205 and about establishing second secure communication session between STS 202 and second (payer) device 205. After establishing the second communication session, the first (payee) device 211 may send to second (payer) device 205 another inter-device communication (transaction message) 223 with a copy of transaction authorization request containing a transaction data, a transaction authorization token, identifier, timestamp. Simultaneously with that or in determined period of time, first communication device 211 may send to STS 202 a transaction authorization request, which is an example of a first message 221 containing the transaction data, a transaction authorization token, identifier, timestamp. Second communication device 205 may forward the transaction authorization request to STS 202 in a transaction confirmation message, which is an example of a second message 222. At STS 202, the transaction may be authorized based on a sequence of first and second transaction message receiving, a receiving time difference, transaction message content match. After the transaction authorization or rejection, the first secure communication session between STS 202 and payer mobile device 205 may be ended.

Figure 3:
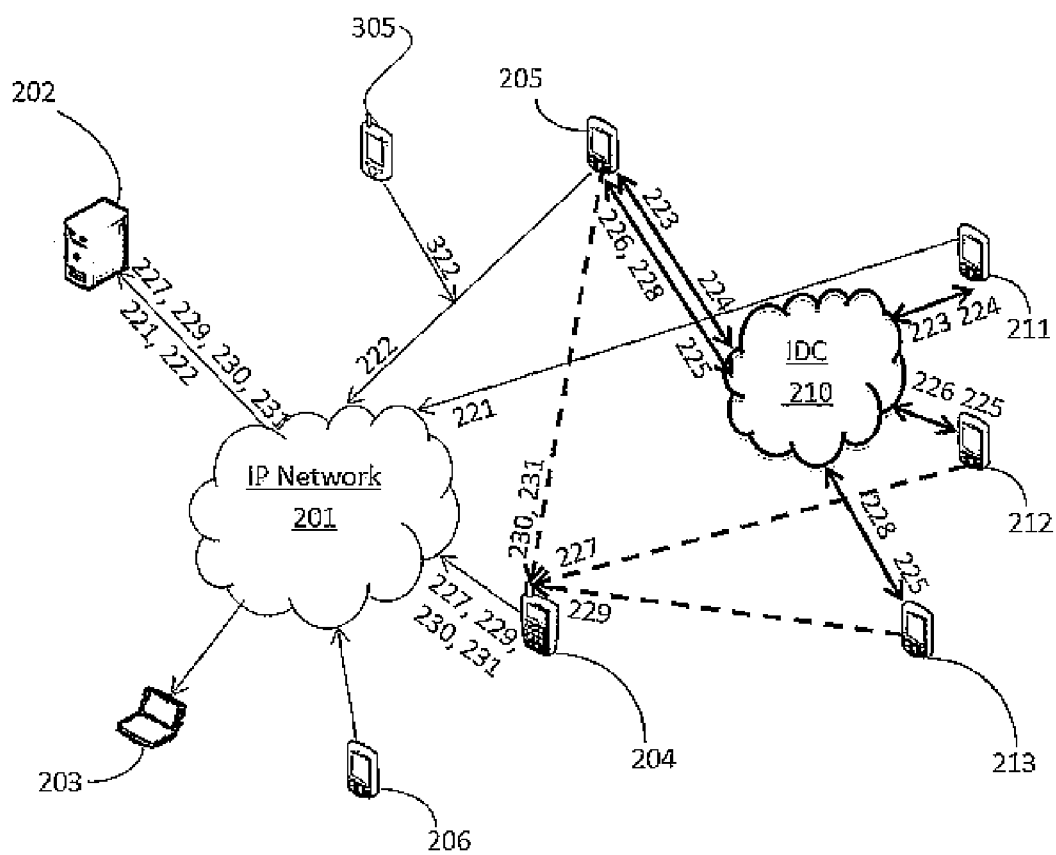
FIG. 3 illustrates the example system with additional detail relating to a potential attack by a malevolent user in the mobile network.

FIG. 3 illustrates the STN system of FIG. 2 with additional detail relating to a potential attack by a malevolent user, arranged in accordance with at least some embodiments described herein. Those components in FIG. 3 that are labeled identically to components of FIG. 2 will not be described again for the purposes of clarity.

A malevolent user may use a communication device 305, when second secure communication session of communication device 305 with STS 202 is not established yet, to perform a network attack 322 on mobile IP network 201 targeting the STN system. Network attack 322 may be a denial-of-service attack, a man-in-the-middle attack, a sniffer attack, an identity spoofing attack, etc. The malevolent user may use device 305 to intercept second communication 222 during its transmission from second communication device 205 to STS 202. Malevolent device 305 may generate a malevolent message 322 substituting the second communication 222. Message 321 may include intercepted identifier, which was forwarded by second device 205.

In an example, at inter-device communication 223 transmitting time 15 ms and forwarding delay 30 ms. The sending of the first communication 221 may be delayed by 30 ms with respect to randomly generated sending time of inter-device communication 223, in order to receive, by STS 202, the second communication 222 after the at least one first communication 221 in about 15 ms, not taking into account transmitting time deviation of communications 221, 222. Malevolent communication device 305 may send message 321 to STS 202 at a time different after sending first message 221, with forwarding delay at least 30 ms. STS 202 may receive message 321 from device 311 with delay respectively the first message 221 receiving time by at least 30 ms. Malevolent message 322 may include timestamp that corresponds to sending message at least 30 ms earlier than actual message 322 sending. STS 202 may execute instructions of protocol 219 to determine a sequence and a time difference between receiving times of message 321 and communication 222. STS 202 may determine the receiving time difference as 15 ms, which is not over a receiving rime difference threshold 31 ms. However, the sequence of receiving of malevolent message 321 (instead of first communication 221) 15 ms after second communication 222 does not correspond to the condition of authentication. In this case, STS 202 may decline to authenticate device 305 and may not authorize transactions with malevolent communication device 305 in response to determining the receiving time sequence.

Figure 4A:
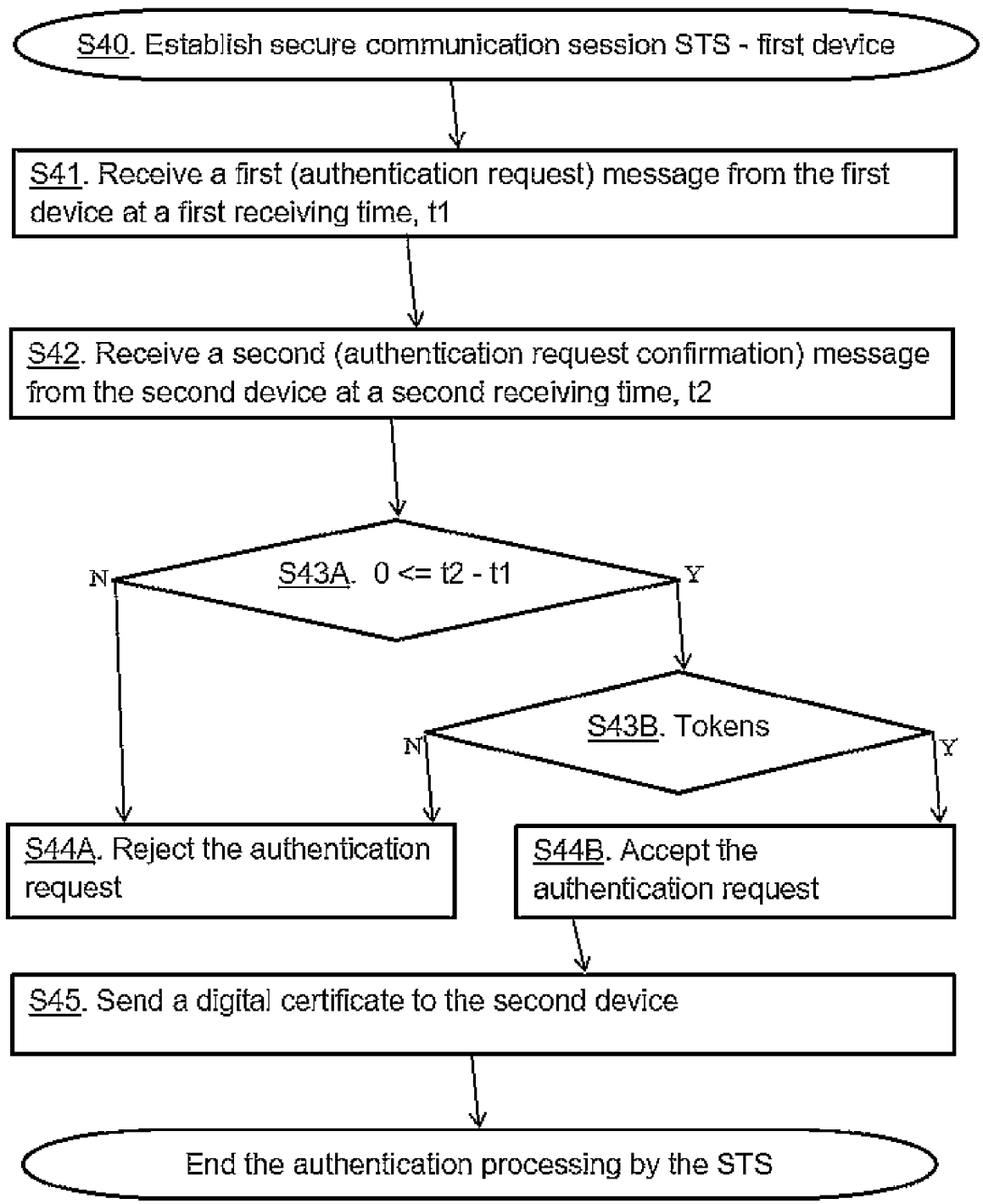
FIG. 4A illustrates a flow chart for an example process for device authentication by the Secure Transaction Server (STS)
Figure 4B:
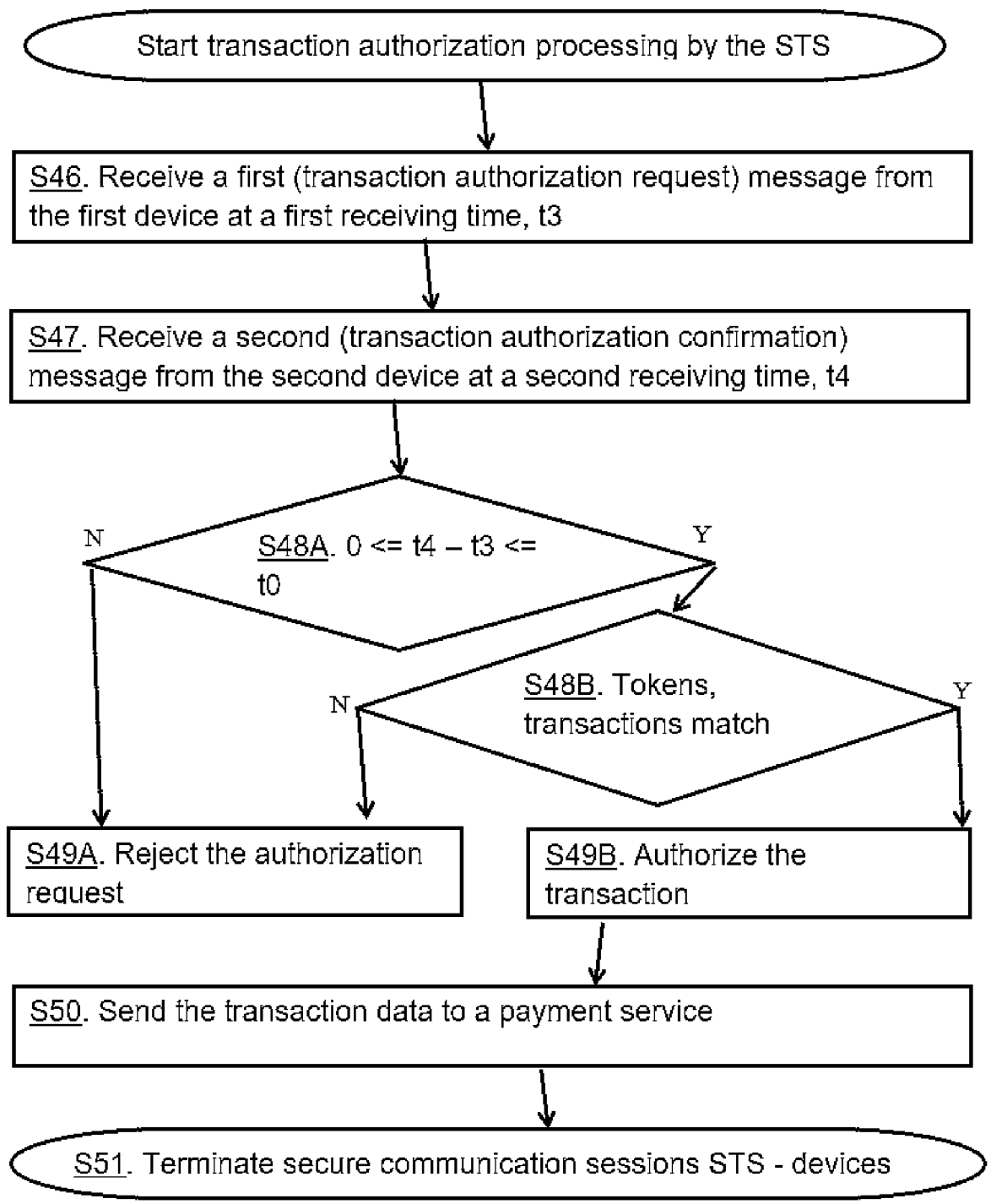
FIG. 4B illustrates a flow chart for an example process for a mobile payment transaction authorization request processing by the STS.

FIGS. 4A, 4B illustrate flow charts for example processes for processing requests for device authentication in a mobile network (steps S41-S45 in FIG. 4A), and for transaction authorization (steps S46-S50 in FIG. 4B) arranged in accordance with at least some embodiments presented herein. The process in FIGS. 4A, 4B could be implemented by STS 202 executing instructions of protocol 219 in STN system represented in FIG. 2. The example processes may include one or more operations, actions, or functions as illustrated by one or more of blocks S41-S50. Although illustrated as discrete blocks, various blocks may be divided into additional blocks, combined into fewer blocks, or eliminated, depending on the desired implementation. Additional blocks may be also added before finishing processing the requests.

Device authentication processing by STS 202 may begin at block S41 in FIG. 4A. At block S41, the STS 202 may receive the first message from the originating (first) communication device 211 at a first receiving time, $t_1$. The first (authentication request) message of first communication 221 represented in FIG. 2 may comprise request for authentication of originate joining communication device, in this case, of the second communication device 205. The first message may also include an identification associated with an originating communication device, such as name and physical address. The authentication request may include a token generated by the originating communication device for the authentication purposes (authentication token).

Processing may continue from block S41 to block S42. At block S42, the STS may receive the second (authentication request confirmation) message of second communication 222 from the second (confirming) communication device 205 at a second receiving time, $t_2$. Before sending the second message, the second communication device 205 may receive the secure inter-device (authentication request) message as a part of inter-device communication 223, including the authentication token generated by the first (originating) communication device 211 and forward it in the second (authentication request confirmation) message of second communication 222. Correspondingly, the authentication confirmation may include the authentication token.

Processing may continue from block S42 to decision blocks S43A, S43B. At block S43A, the STS may determine a receiving sequence the first receiving time $t_1$ and the second receiving time $t_2$ and receiving time difference between $t_2$ and $t_1$. If receiving time sequence is $t_2 >= t_1$ and receiving time difference $t_2 - t_1 <= t_0$, where $t_0$ is an allowable receiving time difference threshold, then authentication tokens match in the first and second messages is verified (block S43B). For example, dependently on the forwarding delay, $t_0 = 30$ ms. If one of the condition above is not fulfilled, the STS may reject the authentication request (block S44A). The STS may authenticate the originating communication device (block S44B) in a case if the sequence of the receiving is the second communication not before the first communication, the difference of the receiving times is not exceeded the allowable receiving time difference threshold $t_0$, and the authentication tokens are matched. In some examples, the forwarding delay variation is $t_0/2$. Then, at the simultaneous sending times by the originating communication device 211, the receiving time difference condition at box S43A may be read as asymmetric (depending on the sequence of receiving) one: $-t_0/2 <= t_2 - t_1 <= 3t_0/2$. In some examples, the sending time difference may be $t_0/2$, then the receiving time difference condition at box S43A may be read as:

$$0 <= t_2 - t_1 <= 2t_0.$$

Processing may continue from block S44B to block S45. At block S45, the STS may send a digital certificate to the joining communication device, for which the authentication request was submitted for, i.e. for the second communication device 205. The second secure communication session may be established between the STS 202 and the joined second communication device 205. The STS may also determine an expiration time of the digital certificate.

Processing of a transaction authorization request may start after sending digital certificate to the originating communication device (block S45). The first (originating) communication device 211 may determine a sending time and simultaneously send first (transaction authorization request) message, which may be represented by first message of first communication 221, to the STS and a correspondent transaction authorization inter-device message with the same content, which may be represented by inter-device communication 223, to the second (confirming) mobile device 205. A corresponding second (transaction authorization confirmation) message, a transaction authorization part of second communication 222, may be sent from the second (confirming) device 205 to the STS 202. Although illustrated as discrete blocks in FIG. 4B, various blocks may be divided into additional blocks, combined into fewer blocks, or eliminated, depending on the desired implementation.

Transaction authorization processing by the STS may begin at block S46. The STS may receive the first (authorization request) message of first communication 221 from the first (originating) communication device 211 at a first receiving time, $t_3$. The first message may comprise request for authorization of the transaction between the originating communication device and the confirming communication device. The first message may include an identifier associated with the originating communication device, such as name and physical address and/or digital certificate data. The transaction authorization request may include a token generated by the originating communication device for the transaction authorization purposes (transaction authorization token).

Processing may continue from block S46 to block S47. At block S47, the STS may receive the second (authorization request confirmation) message of second communication 222 from the second (confirming) communication device 205 at a second receiving time, $t_4$. Before sending the second message, the second secure device 205 may receive the inter-device (transaction authorization request) as a part of secure inter-device communication 223, including the transaction authorization token, from the originating communication device 211 and forward it in the second (transaction authorization confirmation) message. Correspondingly, the transaction authorization confirmation may include the transaction authorization token.

Processing may continue from block S47 to decision blocks S48A, S48B. At block S48A, the STS may determine a receiving sequence the first receiving time $t_3$ and the second receiving time $t_4$ and receiving time difference between $t_4$ and $t_3$. If receiving time sequence is $t_4 >= t_3$ and receiving time difference $t_4-t_3 <= t_0$, where $t_0$ is an allowable receiving time difference threshold. In this example, $t_0=30$ ms, the same like one for the authentication confirmation purposes. Then transaction authorization tokens match in the first and second messages is verified (block S48B). If at least one of the conditions above is not fulfilled, the STS rejects the transaction authorization request (block S49A). The STS authorizes the transaction (block S49B) in a case if the sequence of the message receiving is the second communication 222 after the first communication 221, the difference of the receiving times is not exceeded the allowable delay threshold $t_0$, and the transaction authorization tokens are matched. In some examples, the forwarding delay time may be pre-determined with error of at least half of the allowable delay threshold, i.e. $t_0/2$. It means, at the simultaneous sending times by the originating communication device 211, the real receiving time condition at box S48A may be read as asymmetric time difference condition dependent on the sequence of receiving: $-t_0/2 <= t_4-t_3 <= 3t_0/2$. In some examples, the sending time difference may be $t_0/2$, then the receiving time difference condition at box S43A may be read as:

$$0 <= t_4-t_3 <= 2t_0.$$

Processing may continue from block S49B to block S50. At block S50, the STS 202 may send the transaction data to the payment service 217 for further processing. Once the transaction has ended, additional messages confirming the transaction may be communicated to the confirming and originating communication devices 205, 211 from the STS 202. The second secure communication session between STS 202 and second communication device 205 may be then terminated (block S51). The first secure communication session between STS 202 and first communication device 211 may be then terminated also. The STS may finish processing the requests at this point.

In some examples, the authentication and the transaction authorization requests and request confirmations may be sent in one message pair (in one first and one second message) 221, 222 and be processed after the message pair receiving by STS 202.

Figure 5A:
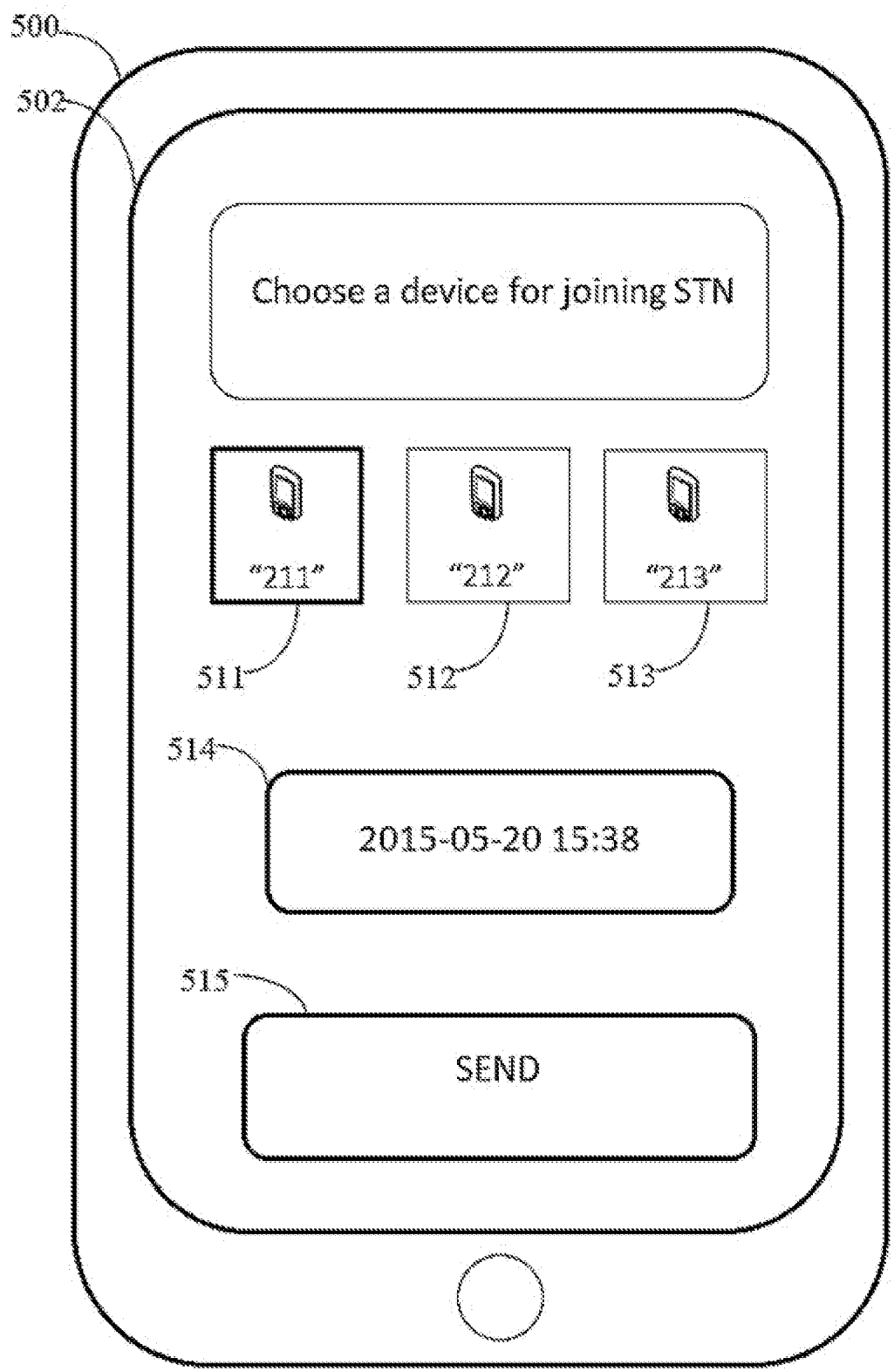
FIG. 5A illustrates an example computer program product that can be utilized to initiate sending an authentication request for processing in the STN.
Figure 5B:
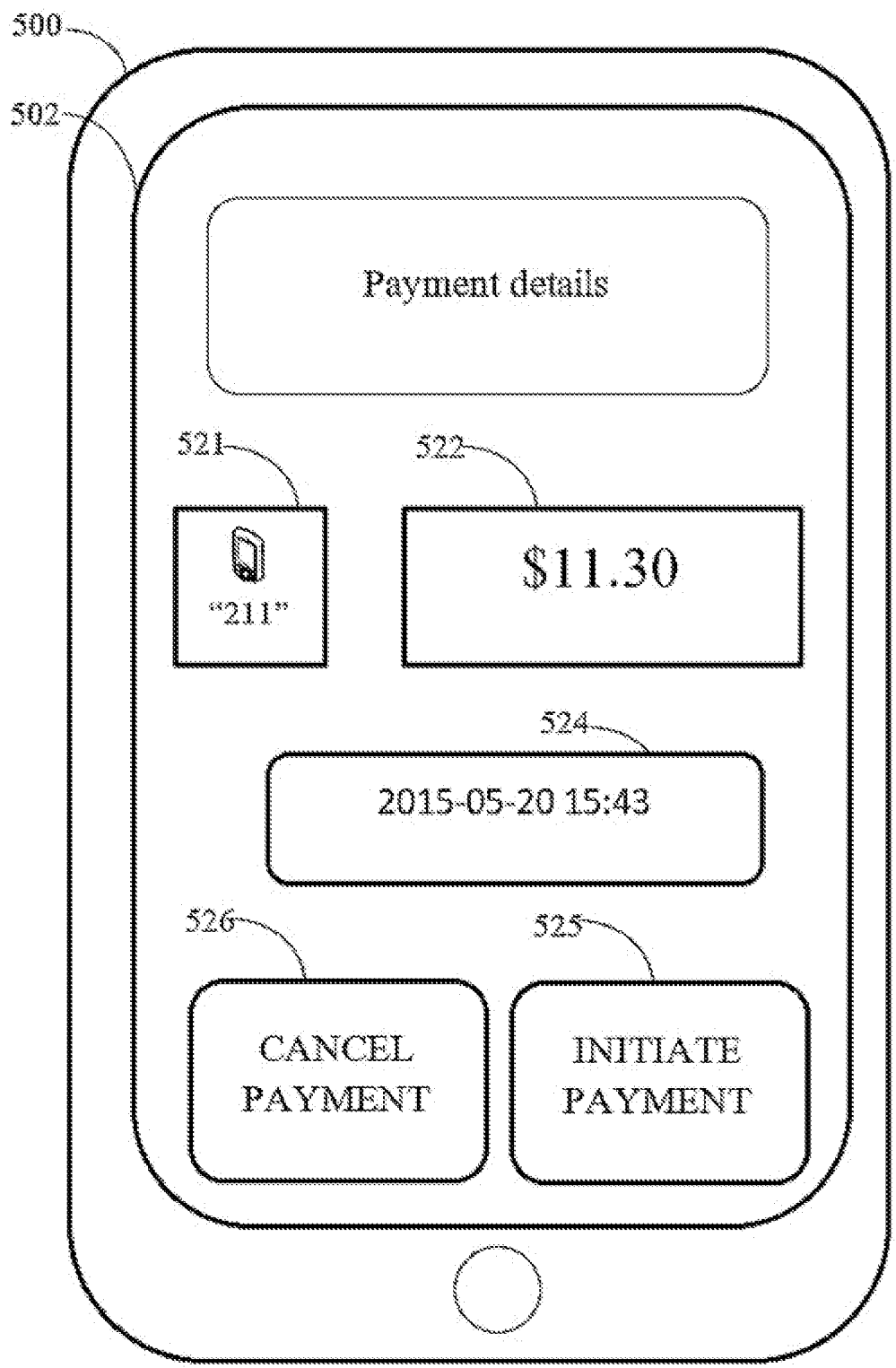
FIG. 5B illustrates an example computer program product that can be utilized to initiate sending a mobile payment transaction authorization request for processing in the STN.

FIGS. 5A, 5B illustrate an example computer program product that can be utilized in the STN to initiate sending, correspondingly, an authentication request and transaction authorization request for processing, as arranged in accordance with at least some embodiments described herein. In some examples, computing device for using the program product may be implemented as a portable (or mobile) electronic device such as a cell phone, a personal data assistant (PDA), a personal media player device, a wireless web-watch device, a personal headset device, an application specific device, or a hybrid device that include any of the above functions. Computing device for using the program product may also be implemented as a personal computer, including both laptop computer and desktop computer configurations.

The STN program product, such as application comprising user protocol 220, may be downloaded to a computing device such as a smartphone 500, which, in some examples, may be identified as a secure communication device 205 (which is in this case first, or originating, communication device 205) with memory 244 or another a signal bearing medium embodying the program. The program uses a smartphone touchscreen 502 and a processor, such as processor 241, which may invoke the program with GUI 251. The application may communicate with a trusted user through smartphone touchscreen 502.

In an instance of choosing device to request authentication for another device joining STN (FIG. 5A), the trusted user of first communication device 205 may touch button elements on the touchscreen 502 (chosen element are shown in bold lines). The trusted user may choose from available NFC-enabled devices indicated as "211" (button element 511—shown in bold as chosen), "212" (button element 512), "213" (button element 513). The trusted user may also change a time, which may be a current time by default, of sending an initial invitation inter-device message, such as a part of inter-device communication 224, using time window element 514. Finally, the trusted user may initiate sending the initial invitation communication to a joining device, such as (in this case second) communication device 211 using button 215 "SEND". On the joining (second) device, an out-of-network user may preliminary choose one of the options to accept or reject the offer for joining the STN. In a case of accepting, the authentication request may be sent to the STS in a pair of authentication request messages from communication devices 205, 211.

In an instance of requesting transaction authorization for the chosen device (FIG. 5B), the trusted user may touch button elements on the touchscreen 502. The trusted user of first communication device 205, using button element 521, may choose an available NFC-enabled second communication device 211 indicated on the touchscreen as "211". The trusted user may also change a transaction amount, which may be an amount sent preliminary from the originating communication device using box element 522. The trusted user may also change a time, which may be a current time by default, of sending a transaction initiation inter-device message using time window element 524. Finally, the trusted user may initiate or cancel the payment using button elements 525, 526. Pressing "INITIATE PAYMENT" button 525, the trusted user sends the transaction initiation inter-device message to the originating communication device. After the sending the transaction initiation inter-device message, in a case when the user of second communication device 211 preliminary pressed corresponding button "CONFIRM PYMENT" on his device, receiving the transaction authorization request may be confirmed by the STS 202. In a case of approving the request, correspondent message may appear on the touchscreen 502.

The proposed method addresses the issue of verifying identity of a communication device joining STN after establishing secure short-range communication link with a trusted device, which may be in secure communication session with a secure server. In such a way, the transaction authorization is based on the communication device pairing proof. The method decreases risks accounted for in so-called "card is not present" fee and also simplifies adding a new merchant to the payment network.

The method is applicable, particularly, in rural and underdeveloped areas, where options of traditional identity confirmation are restricted.

It is to be understood that the terminology used herein is for the purpose of describing particular embodiments only, and is not intended to be limiting. With respect to the use of substantially any plural and/or singular, general and/or particular terms herein, those having skill in the art can translate from the plural to the singular and/or from the singular to the plural, from the general to the particular and/or from the particular to the general as is appropriate to the context and/or application. The various singular/plural, particular/general permutations may be expressly set forth herein for sake of clarity. It will be understood that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

While various aspects and embodiments have been disclosed herein, other aspects and embodiments will be apparent to those skilled in the art. Many modifications and variations can be made without departing from its spirit and scope, as will be apparent to those skilled in the art. Such modifications and variations are intended to fall within the scope of the claims. The various aspects and embodiments disclosed herein are for purposes of illustration and are not intended to be limiting, with the true scope and spirit being indicated by the following claims.

What is claimed is:

1. A network communication method for processing at least one transaction request, comprising:
   authenticating, by at least one server, at least one of a first communication device and at least one second communication device;
   establishing a secure inter-device communication link between the first communication device and the at least one second communication device;
   by the first communication device:
      sending to the at least one second communication device at least one secure inter-device communication including an identifier, and sending time of the at least one secure inter-device communication, in order to process, by the at least one server, at least one transaction request; the at least one transaction request is related to at least one of the first communication device and the at least one second communication device, wherein the sending time of the at least one secure inter-device communication is not communicated to the at least one second communication device prior to the at least one secure inter-device communication;
      sending a first message to the at least one server, the first message including a first identifier matching the identifier;
   by the at least one second communication device:
      receiving from the first communication device the communication;
      sending at least one second message to the at least one server within a predetermined forwarding delay threshold after receiving the communication, the second message including at least one second identifier matching the identifier;
   by the at least one server processing the at least one request, the processing comprising:
      receiving the first message and the at least one second message;
      determining mutual matching of the first and the at least one second identifiers;
      determining a sequence of receiving of the first and the at least one second messages;
      determining a receiving time difference of the first and the at least one second messages;
      determining a receiving time difference threshold based on a predetermined forwarding delay threshold;
      comparing the receiving time difference with the receiving time difference threshold, and
      identifying the at least one transaction request as secure request and accepting the transaction request based on the determined mutual matching of the first and the at least one second identifiers, sequence of receiving, and receiving time difference, when the determined receiving time difference is within the receiving time difference threshold.

2. The method of claim 1, wherein the first message is sent at time which is not earlier than the at least one secure inter-device communication sending time; wherein a sending time difference between the first message and the at least one secure inter-device communication is at most the predetermined forwarding delay threshold; wherein the predetermined forwarding delay threshold includes 30 milliseconds; and wherein, by the at least one server, the at least one request is rejected if the at least one second identifier is received before the first identifier.

3. The method of claim 1, further comprising:
determining a sending time difference between the first message and the at least one secure inter-device communication, and
wherein the receiving time difference threshold is determined additionally based on the secure inter-device communication transmission time.

4. The method of claim 1, wherein, the at least one secure inter-device communication is transmitted after establishing, between the first communication device and the at least one second communication device, the at least one inter-device secure communication link configured accordingly to a short-range communication protocols and wherein the at least one secure inter-device communication includes additional data related to at least one of device credentials and location of the at least one second communication device, in order to process, by the at least one server, the at least one request based on the additional data.

5. The method of claim 1, wherein, the at least one secure inter-device communication is transmitted through at least one routing device.

6. The method of claim 1, wherein the at least one request comprises at least one transaction authorization request.

7. The method of claim 1, wherein, by the at least one of the first and the at least one second communication devices, the identifier is generated randomly.

8. The method of claim 1, further comprising, by the at least one of the first and the at least one second communication devices, transmitting, to the at least another of the first and the at least one second communication devices, a public encryption key, in order to encrypt the first message and the at least one second message.

9. The method of claim 8, wherein, the at least one server, in response to the at least one request, establishes at least one secure communication session with the at least another of the first and the at least one second communication devices.

10. The method of claim 1, wherein, the first message and the at least one second message are sent, to the at least one server, through a routing device; and wherein the predetermined forwarding delay threshold includes at most 30 milliseconds, preferably 3 milliseconds.

11. A system for processing at least one transaction request, comprising:
a first communication device;
at least one second communication device;
wherein the first communication device and the at least one second communication device are configured to establish a secure inter-device communication link between each other;
at least one server configured to authenticate at least one of the first communication device and the at least one second communication device;
the first communication device is configured to:
send to the at least one second communication device at least one secure inter-device communication including an identifier, and sending time of the at least one secure inter-device communication, in order to process, by at least one server, at least one transaction request; the at least one transaction request is related to at least one of the first communication device and the at least one second communication device, wherein the sending time of the at least one secure inter-device communication is not communicated to the at least one second communication device prior to the at least one secure inter-device communication;
send a first message to the at least one server, the first message including a first identifier matching the identifier;
the at least one second communication device is configured to:
receive from the first communication device the communication;
send at least one second message to the at least one server within a predetermined forwarding delay threshold after receiving the communication, the second message including at least one second identifier matching the identifier;
the at least one server further configured to process the at least one request, and configured to:
receive the first message and the at least one second message;
determine mutual matching of the first and the at least one second identifiers;
determine a sequence of receiving of the first and the at least one second messages;
determine a receiving time difference of the first and the at least one second messages;
determine a receiving time difference threshold based on a predetermined forwarding delay threshold;
compare the receiving time difference with the receiving time difference threshold, and
identify the at least one transaction request as secure request and accept the transaction request based on the determined mutual matching of the first and the at least one second identifiers, sequence of receiving, and receiving time difference, when the determined receiving time difference is within the receiving time difference threshold.

12. The system of claim 11, wherein the first communication device is further configured to send the first message at time which is not earlier than the at least one secure inter-device communication sending time, and wherein a sending time difference between the first message and the at least one secure inter-device communication is based on the predetermined forwarding delay threshold in order to receive, by the at least one server, the second identifier after the first identifier.

13. The system of claim 11, wherein the first communication device is further configured to send the at least one inter-device communication at random time.

14. The system of claim 11, wherein, the at least one inter-device secure communication link comprises at least one short-range inter-device secure communication link based on at wireless or infrared communication protocols.

15. The system of claim 11, further comprises a routing device connected to the first and the at least one second communication devices to implement the inter-device secure communication link, the routing device configured to transmit, to the at least one server, the first message and the at least one second message.

16. The system of claim 11, wherein, the at least one of the first device and the at least one second communication device is further configured to forward, to the at least one server, additional data related to at least one of credentials and location of the at least another of the first and the at least one second communication devices; and wherein the at least one server is further configured to process the at least one request based on said additional data.

17. The system of claim 16, wherein, the at least one of the first device and the at least one second communication device comprises a sensor configured to collect the additional data.

18. The system of claim 17, wherein the at least another of the first and the at least one second communication devices is attached to an identified object.

19. The system of claim 11, wherein, the at least one of the first device and the at least one second communication device is a payer device, and is further configured to originate another financial transaction authorization request, and to confirm the at least one transaction request comprising at least one financial transaction authorization request.

20. A network communication method for processing matching requests, comprising:
   authenticating, by at least one server, at least one of originating device and at least one confirming communication device;
   sending, in at least one secure inter-device communication, from the originating communication device to the at least one confirming communication device, at least one request related to at least one of the originating and the at least one confirming communication devices, the request including at least one secure inter-device communication sending time; wherein at least one secure inter-device communication sending time is not communicated to the at least one confirming device prior to the at least one secure inter-device communication;
   by the originating communication device:
      sending, to the at least one server, in at least one first message, at least one first request matching to the at least one request;
   by the at least one confirming communication device:
      receiving, from the originating communication device, the at least one request in the at least one secure inter-device communication;
      sending, to the at least one server, in at least one second message, within a predetermined forwarding delay threshold after receiving the at least one request, at least one second request matching to the at least one request; and,
   by the at least one server, processing the at least one request, the processing comprising:
      receiving, from the originating communication device, the at least one first request in the at least one first message;
      receiving, from the at least one confirming communication device, the at least one second request in the at least one second message;
      determining a sequence of receiving of the at least one first and the at least one second requests;
      determining a receiving time difference of the at least one first and the at least one second requests,
      determining mutual matching of the at least one first and at least one second requests;
      determining a receiving time difference threshold based on the predetermined forwarding delay threshold; and
      identifying the at least one request as secure request and accepting the at least one request based on the determined mutual matching of the at least one first and the at least one second requests, the sequence of receiving, and the receiving time difference, when the determined receiving time difference is within the receiving time difference threshold.

* * * * *